UNITED STATES PATENT OFFICE.

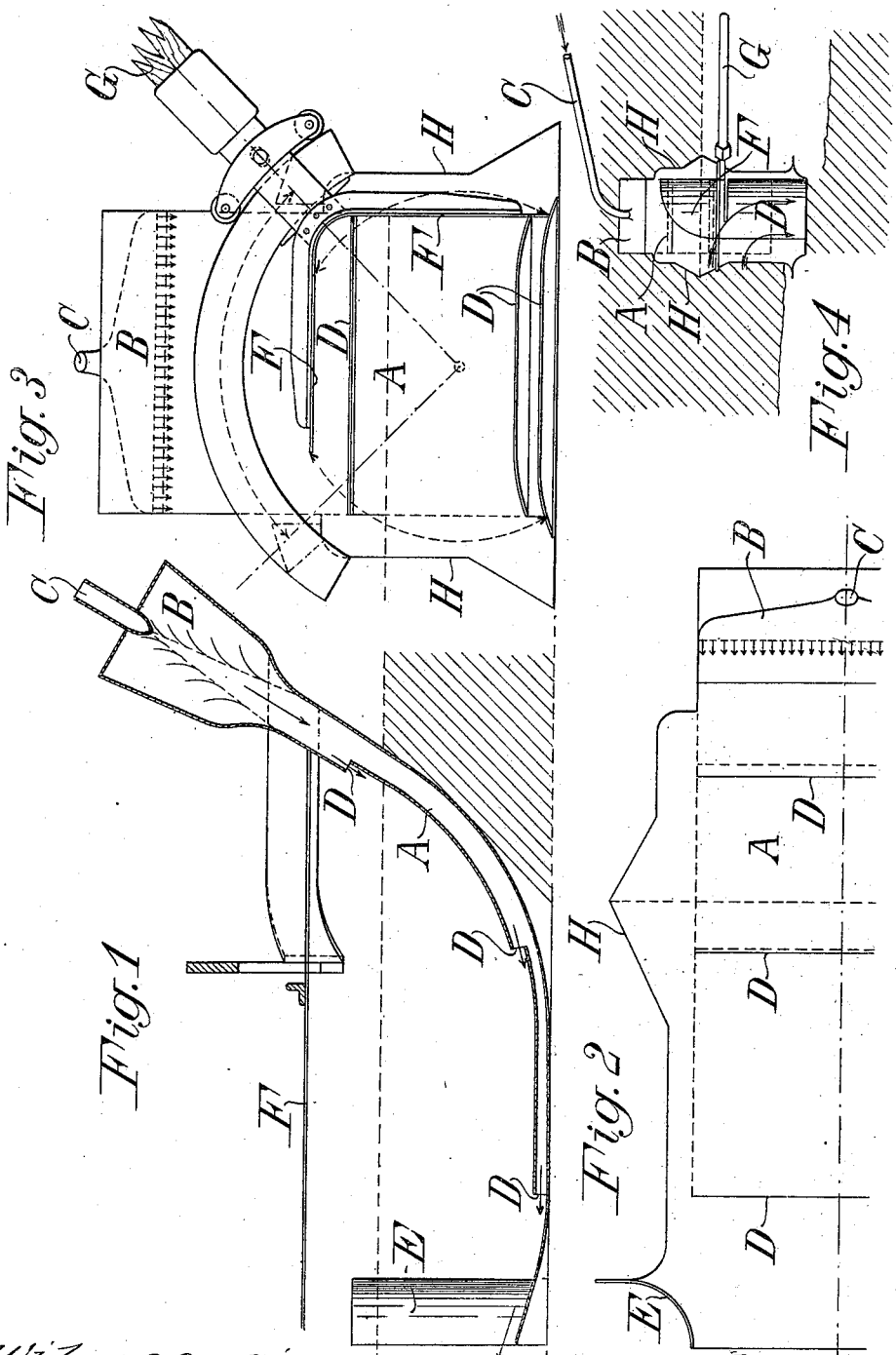

CARL SCHAU, OF KLEIN-SCHWECHAT, NEAR VIENNA, AUSTRIA-HUNGARY.

APPARATUS FOR TURNING GERMINATING GRAIN IN MALTING.

982,189.     Specification of Letters Patent.     Patented Jan. 17, 1911.

Application filed July 26, 1909. Serial No. 509,603.

*To all whom it may concern:*

Be it known that I, CARL SCHAU, subject of the Emperor of Austria-Hungary, residing at Klein-Schwechat, near Vienna, Austria-Hungary, have invented certain new and useful Improvements in Apparatus for Turning Germinating Grain in Malting, of which the following is a specification.

Germinating malt is turned over on the malting floor for the purpose of allowing the process of germination of the softened grains to proceed smoothly and of regulating the same by aerating and supplying or removing heat at the same time as the turning over is effected. This turning over of the malt has hitherto been almost exclusively done manually with wooden shovels. Even in the few isolated cases when mechanically operated turning devices have been employed, shovels or shovel-like elements have been used to turn over the germinating malt. But both when using the hand shovel and the mechanically driven turning devices the tender germs of the malt are always more or less damaged. In order to sufficiently aerate the germinating malt during the turning, when using hand shovels, the malt is usually thrown through the air in large arcs, while with mechanical turning devices a current of fresh air is generally blown into the malt.

The object of the present invention is an apparatus for effecting the turning of the malt, the germs being protected as much as possible.

By means of an air compressor arranged anywhere outside the malting floor, compressed air is led through piping or tubing to a shovel like hollow body provided with air outlets, which is led along the surface of the malt heap to be turned. In this manner owing to the forward motion of the hollow body the malt is caught up by the air issuing from the same, carried along by it and re-deposited on another empty part of the floor.

An apparatus for carrying out this process may be constructed as shown for example, in the accompanying drawings which show the apparatus in longitudinal section in Figure 1, in plan in Fig. 2, parts being cut away, and in vertical cross section in Fig. 3. Fig. 4, in which as in Fig. 1 the malt heap is denoted by the shaded portions, shows the mode of operation of the device and is a plan of the same, the upper shaded portion being the malt before turning, while the lower shaded portion is the malt heap after turning.

A hollow body A bent to the shape of a shovel having a flat cross section has at its upper end a nozzle B of gradually increasing cross section, into which compressed air is blown from pipe C. The current of air increased in quantity by air admitted to the nozzle B from outside passes out of slot like openings D tangentially to the hollow body A and throws the malt, which collects on the top of the hollow body as the apparatus is moved forward over the malt heap, between the guide plates E onto a clear part of the malting floor. A rotatable angular cover F covers in part the hollow body and at the side there is a handle G which serves to push the apparatus over the malt heap; the sides H of the hollow body A being given a wedgelike shape enables the malt to be easily divided and to slide easily onto the hollow body. So as to be able to work the apparatus in both directions the cover F and handle G are made reversible.

Since it is inadvisable to supply a small quantity of compressed air at high pressure to the nozzle, in order to be able to have success with pipes of small diameter, the compressed air supply can be reinforced, as described in the present case, with outside air sucked in through a nozzle of increasing cross-section so that it issues from the slots D with a lower velocity but in a larger volume than its original pressure and quantity. Furthermore the current of compressed air may be damped and cooled before entering the apparatus.

Claim:

1. A maltster's shovel comprising a body provided with a cover movable across the upper face thereof and a handle for moving said cover and for advancing the shovel.

2. A maltster's shovel having its body porvided at its opposite side edges with tapering guide walls and with curved guide plates located at the front ends of said walls.

3. A maltster's shovel having its body provided at its opposite side edges with tapering upstanding guide walls and with curved guide plates located at the front ends of said walls.

4. A maltster's shovel having its body porvided with a reversible cover movable across the upper face thereof, and with a reversible handle connected to said cover for moving the latter and for advancing the shovel.

5. A maltster's shovel having a hollow body portion of gradually increasing thickness formed with a transversely-stepped upper face provided at the points of intersection of its steps with transverse slots, and means located at the upper end of said body portion for supplying compressed air to the interior thereof.

6. In a maltster's shovel, the combination of a slotted hollow body portion having a cover movable across the upper face thereof, and means located at the upper end of said body portion for supplying compressed air to the interior thereof.

7. In a maltster's shovel, the combination of a slotted hollow body portion provided at its opposite side edges with upstanding walls for guiding the malt thereonto, and means located at the upper end of said body portion for supplying compressed air to the interior thereof.

8. In a maltster's shovel, a body portion provided at its opposite side edges with upstanding walls for guiding the malt thereonto, and a reversible cover movable across the upper face of said body portion.

9. In a maltster's shovel, the combination of a slotted hollow body portion having a cover movable across the upper face thereof, guides provided at the opposite side edges of said body portion for directing the malt thereonto, and means located at the upper end of said body portion for supplying compressed air to the interior thereof.

In testimony whereof I have hereunto set my hand in presence of two subscribing witnesses.

CARL SCHAU.

Witnesses:
  JOSEF RUBASCH,
  ROBERT W. HEINGARTNER.